United States Patent
Kim et al.

(10) Patent No.: US 7,957,585 B2
(45) Date of Patent: Jun. 7, 2011

(54) APPARATUS AND METHOD FOR SPATIALLY PREDICTING, ENCODING, COMPENSATING AND DECODING IMAGE DATA

(75) Inventors: Wooshik Kim, Yongin-si (KR); Seungwoo Lee, Seoul (KR); Woochul Kim, Uijeongbu-si (KR); Dmitri Birinov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 995 days.

(21) Appl. No.: 11/264,017

(22) Filed: Nov. 2, 2005

(65) Prior Publication Data
US 2006/0126727 A1   Jun. 15, 2006

(30) Foreign Application Priority Data
Dec. 13, 2004  (KR) .................. 10-2004-0104922

(51) Int. Cl.
*G06K 9/00*  (2006.01)
(52) U.S. Cl. ......... 382/162; 382/232; 382/233; 382/236
(58) Field of Classification Search .............. 382/232, 382/233, 236, 238, 239, 250, 247, 162; 375/E7.128, 375/E7.153, 240.01, 240.16
See application file for complete search history.

(56) References Cited

U.S. PATENT DOCUMENTS

| | | | | |
|---|---|---|---|---|
| 7,162,091 | B2 * | 1/2007 | Wang et al. | 382/233 |
| 7,266,247 | B2 * | 9/2007 | Kim et al. | 382/236 |

FOREIGN PATENT DOCUMENTS
EP   1 478 189   11/2004

OTHER PUBLICATIONS

Tamhanka, A. et al., "An Overview of H.264/MPEG-4 Part 10," 4$^{th}$ EURASIP Conference focused on Video/Image Processing and Multimedia Communications, pp. 1-51, Zagreb, Croatia, Jul. 2-5, 2003.
Yin, Peng et al., "Fast Mode Decision and Motion Estimation for JVT/H.264," IEEE International Conference on Image Processing, vol. 2 of 3, pp. 853-856, New York, NY, Sep. 14, 2003.
Pan, F. et al., "Fast Intra Mode Decision Algorithm for H.264/AVC Video Coding," IEEE International Conference on Image Processing, vol. 1, pp. 781-784, Piscataway, NJ, Oct. 24, 2004.
Nan, Zhang et al., "Spatial Prediction Based Intra-Coding," IEEE International Conference on Multimedia and Expo, vol. 1, pp. 97-100, Piscataway, NJ, Jun. 27, 2004.

* cited by examiner

*Primary Examiner* — Anh Hong Do
(74) *Attorney, Agent, or Firm* — Staas & Halsey LLP (57) ABSTRACT

An apparatus and method for spatially predicting image data, an apparatus and method for encoding image data, an apparatus and method for compensating for spatial prediction of image data, and an apparatus and method for decoding image data. The spatial prediction apparatus of image data includes: a spatial prediction unit performing a spatial prediction of pixel values of a current block using pixel values of blocks adjacent to an upper row of the current block. A pipeline process is possible when the spatial prediction is performed, thereby performing real time encoding and decoding.

30 Claims, 10 Drawing Sheets

APPARATUS AND METHOD FOR SPATIALLY PREDICTING, ENCODING, COMPENSATING AND DECODING IMAGE DATA

CROSS-REFERENCE TO RELATED APPLICATION

This application claims the priority of Korean Patent Application No. 10-2004-0104922, filed on Dec. 13, 2004, in the Korean Intellectual Property Office, the disclosure of which is incorporated herein by reference.

BACKGROUND OF THE INVENTION

1. Field of the Invention

The present invention relates to encoding and decoding of image data, and more particularly, to an apparatus and method for spatially predicting image data, an apparatus and method for encoding image data, an apparatus and method for compensating for spatial prediction of image data, and an apparatus and method for decoding image data.

2. Description of Related Art

Conventionally, spatial prediction (referred to as Intra prediction) is required to encode image data. Intra spatial predictive encoding is a technology for predicting pixel values of a current block using spatial correlation of an image. To be more specific, a differential value of decoded pixel values of blocks adjacent to the current block and correlated with pixel values of the current block is used to predict pixel values of the current block.

Figure 1:
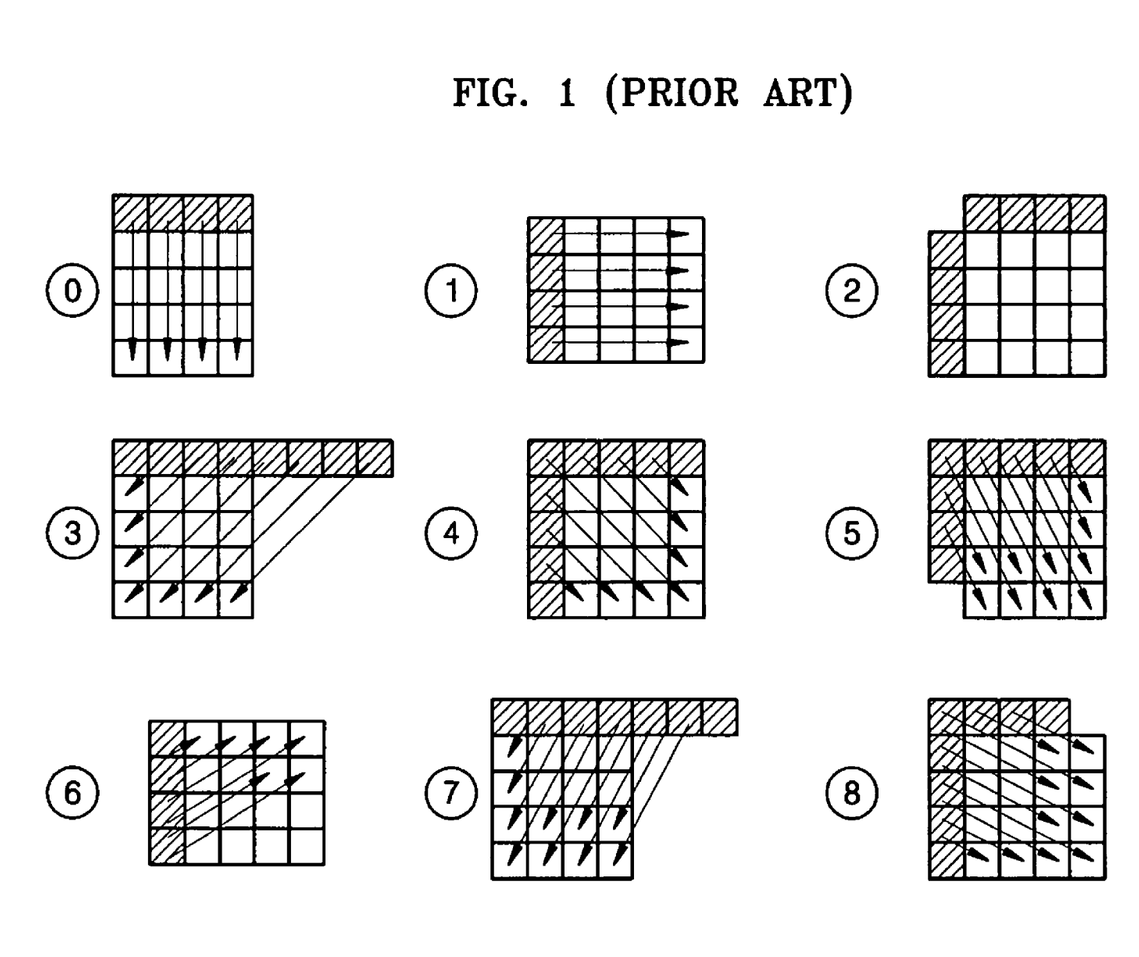
FIG. 1 is a diagram illustrating directions predicted by performing a conventional spatial prediction.

FIG. 1 is a diagram illustrating eight directions predicted by performing a conventional spatial prediction. Referring to FIG. 1, pixel values of an upper row or a left row of a current block are used to perform the spatial prediction in a variety of directions.

However, since the conventional spatial prediction is performed using pixel values of blocks on the left of the current block, it is impossible to perform real time spatial prediction and encoding.

Figure 2:
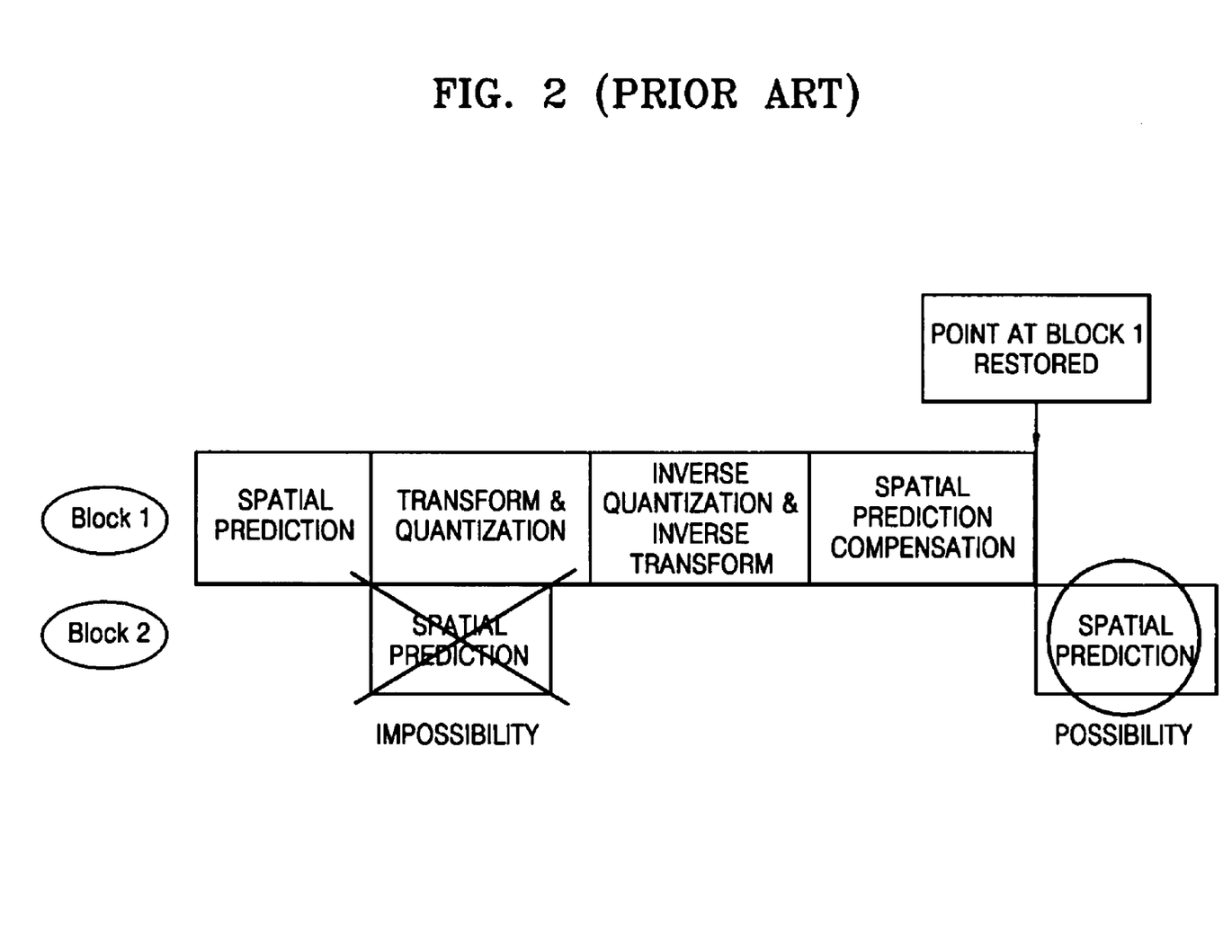
FIG. 2 is a diagram illustrating a pipeline processing that is not performed using the conventional spatial prediction.

FIG. 2 is a diagram illustrating a pipeline processing that is not performed using the conventional spatial prediction. The pipeline processing is a technology for performing the spatial prediction of the current block immediately after performing the spatial prediction of a previous block. However, the spatial prediction of the current block using pixel values of blocks on the left of the current block can be performed using pixel values of restored blocks adjacent to the current block after performing the spatial prediction, transform and quantization, inverse quantization and inverse transform, and spatial prediction compensation of blocks adjacent to the current block. Referring to FIG. 2, the pipeline processing is not performed using pixel values of blocks on the left of the current block. Such a pipeline processing failure causes failures of a real time encoding and decoding of image data.

BRIEF SUMMARY

An aspect of the present invention provides an apparatus for spatially predicting image data that can perform real time encoding using a pipeline processing in a spatial prediction.

An aspect of the present invention also provides an apparatus for encoding image data that can perform the real time encoding using the pipeline processing.

An aspect of the present invention also provides a method of spatially predicting image data that can the perform real time encoding using the pipeline processing in the spatial prediction.

An aspect of the present invention also provides a method of encoding image data that can perform the real time encoding using the pipeline processing.

An aspect of the present invention also provides an apparatus for compensating for spatial prediction of image data that can compensate for a real time prediction of image data that are encoded in real time.

An aspect of the present invention also provides an apparatus for decoding image data that can perform a real time decoding of image data that are encoded in real time.

An aspect of the present invention also provides a method of compensating for spatial prediction of image data that can compensate for the real time prediction of image data that are encoded in real time.

An aspect of the present invention also provides a method of decoding image data that can perform the real time decoding of image data that are encoded in real time.

According to an aspect of the present invention, there is provided an apparatus for spatially predicting image data, the apparatus including: a spatial prediction unit performing a spatial prediction of pixel values of a current block using pixel values of blocks adjacent to an upper row of the current block.

According to another aspect of the present invention, there is provided an apparatus for encoding image data, the apparatus including: a spatial prediction unit performing a spatial prediction of pixel values of a current block using pixel values of blocks adjacent to an upper row of the current block; a transform and quantization unit transforming and quantizing spatially predicted pixel values; and a bit stream generating unit generating bit streams of the transformed and quantized pixel values.

According to still another aspect of the present invention, there is provided a spatial prediction method for image data, the method including: performing spatial prediction of pixel values of a current block using pixel values of blocks adjacent to an upper row of the current block.

According to still another aspect of the present invention, there is provided an image data encoding method, the method including: performing a spatial prediction of pixel values of a current block using pixel values of blocks adjacent to an upper row of the current block; transforming and quantizing spatially predicted pixel values; and generating bit streams of the transformed and quantized pixel values.

According to still another aspect of the present invention, there is provided an apparatus for compensating for spatial prediction of image data, the apparatus including: a spatial prediction compensation unit compensating for spatially predicted pixel values using blocks adjacent to an upper row of a current block among blocks adjacent to the current block.

According to still another aspect of the present invention, there is provided an image data decoding apparatus, the apparatus including: a bit stream decoding unit decoding bit streams of image data; an inverse quantization and inverse transform unit inverse quantizing and inverse transforming the decoded image data; and a spatial prediction compensation unit compensating for spatially predicted pixel values using blocks adjacent to the upper row of the current block among blocks adjacent to the current block.

According to still another aspect of the present invention, there is provided a method of compensating for spatial prediction of image data, the method including: compensating for spatially predicted pixel values using blocks adjacent to the upper row of the current block among blocks adjacent to the current block.

According to still another aspect of the present invention, there is provided an image data decoding method, the method including: decoding bit streams of image data; inverse quantizing and inverse transforming the decoded image data; and compensating for spatially predicted pixel values using blocks adjacent to the upper row of the current block among blocks adjacent to the current block.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
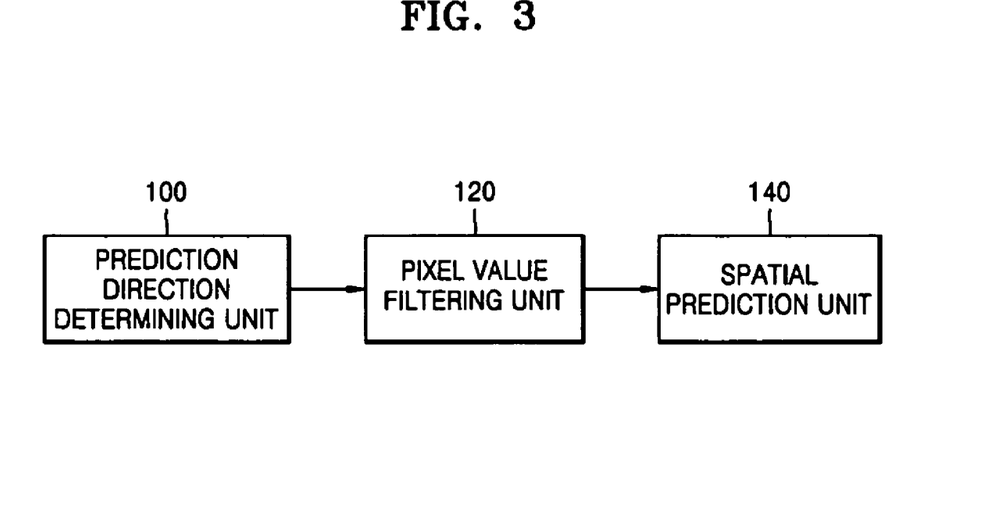
FIG. 3 is a block diagram of a spatial prediction apparatus of image data according to an embodiment of the present invention.

FIG. 3 is a block diagram of a spatial prediction apparatus for image data according to an embodiment of the present invention. The spatial prediction apparatus comprises a prediction direction determining unit 100, a pixel value filtering unit 120, and a spatial prediction unit 140.

The prediction direction determining unit 100 determines a spatial prediction direction according to pixel values of blocks adjacent to an upper row of a current block when spatially predicting pixel values of the current block using blocks spatially adjacent to the current block, and outputs the determined result to the pixel value filtering unit 120.

The spatial prediction direction may be a perpendicular direction, a right slant direction, or a left slant direction, which are determined using pixel values of blocks adjacent to the upper row of the current block.

Figure 4:
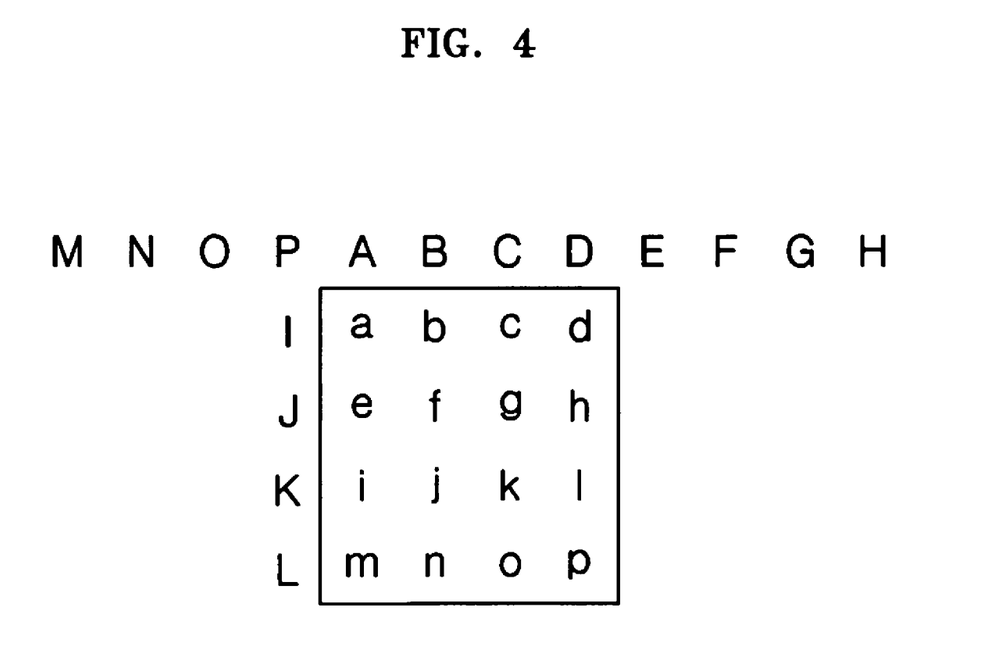
FIG. 4 is a diagram illustrating an example of pixel values of a 4×4 block and pixel values of blocks adjacent to the 4×4 block.

FIG. 4 is a diagram illustrating an example of pixel values of a 4×4 block and pixel values of blocks adjacent to the 4×4 block. Referring to FIG. 4, a method of determining the spatial prediction direction using pixel values of blocks adjacent to the 4×4 block is described.

Among sums of differential values between pixel values of the current block and pixel values of blocks adjacent to the current block for each component of an RGB signal, a direction having a minimum sum value is determined as the spatial prediction direction. Differential values between pixel values of the current block and pixel values of blocks adjacent to the current block are a'=a–A, b'=b–B, c'=c–C, d'=d–D, e'=e–A, f'=f–B, g'=g–C, h'=h–D, i'=i–A, j'=j–B, k'=k–C, l'=l–D, m'=m–A, n'=n–B, o'=o–C, p'=p–D, which indicate the perpendicular direction. Sums of differential values of the perpendicular direction for each of the RGB components are $S_1$, $S_2$, and $S_3$. Differential values between pixel values of the current block and pixel values of blocks adjacent to the current block are a'=a–P, b'=b–A, c'=c–B, d'=d–C, e'=e–O, f'=f–P, g'=g–A, h'=h–B, i'=i–N, j'=j–O, k'=k–P, l'=l–A, m'=m–M, n'=n–N, o'=o–O, p'=p–P, which indicate the right slant direction. Sums of differential values of the right slant direction for each of the RGB components are $S_4$, $S_5$, and $S_6$. Differential values between pixel values of the current block and pixel values of blocks adjacent to the current block are a'=a–B, b'=b–C, c'=c–D, d'=d–E, e'=e–C, f'=f–D, g'=g–E, h'=h–F, i'=i–D, j'=j–E, k'=k–F, l'=l–G, m'=m–E, n'=n–F, o'=o–G, p'=p–H, which indicate the left slant direction. Sums of differential values of the left slant direction for each of RGB components are $S_7$, $S_8$, and $S_9$. Among sums ($S_1$, $S_2$, $S_3$, $S_4$, $S_5$, $S_6$ $S_7$, $S_8$, and $S_9$), prediction directions having minimum differential values of each of the RGB components are determined as spatial prediction directions of each of the RGB components.

RGB components may have a different prediction direction, or a common prediction direction. When RGB components have the different prediction direction, a prediction direction having a minimum value among $S_1$, $S_4$, $S_7$ is determined as the prediction direction of component R, the prediction direction having a minimum value among $S_2$, $S_5$, $S_8$ is determined as the prediction direction of component G, and the prediction direction having a minimum value among $S_3$, $S_6$, $S_9$ is determined as the prediction direction of component B.

When RGB components have the common prediction direction, the prediction direction having a minimum value among $S_P=S_1+S_2+S_3$, $S_R=S_4+S_5+S_6$, and $S_L=S_7+S_8+S_9$ is determined as the spatial prediction direction.

Among direction determination values using sums of differential values of between pixel values of the current block and pixel values of blocks adjacent to the current block and compression rates of directions, the prediction direction having a maximum value is determined as the spatial prediction direction. The direction determination values are calculated using Equation 1:

$$C = D + \lambda R \qquad (1)$$

wherein C refers to direction determination values of directions, D refers to sums of differential values of between pixel values of the current block and pixel values of blocks adjacent to the current block, λ refers to a predetermined constant value, and R refers to compression rates of directions.

The pixel value filtering unit 120 filters pixel values of blocks adjacent to the upper row of the current block used for the spatial prediction of the current block, and outputs the filtered pixel values to the spatial prediction unit 140. The filtering is required to prevent an image degradation caused by the spatial prediction using only pixel values of blocks adjacent to the upper row of the current block.

Returning to FIG. 3, a filtering method will now be described with reference to FIG. 4. When the perpendicular direction is determined as the spatial prediction direction, a pixel value A used for the spatial prediction is used as an average value of pixel values adjacent to the right and left of the pixel value A. One of pixel values (P+B)/2, (P+2A+B)/4, and (2O+3P+6A+3B+2C)/16, etc. is used as the pixel value A. One of pixel values (A+C)/2, (A+2B+C)/4, (2P+3A+6B+3C+2D)/16, etc. is used as the pixel value B. Other pixel values of blocks adjacent to the current block are filtered as described above. Filtering is performed on many pixel values of blocks adjacent to the current block.

The spatial prediction unit 140 performs the spatial prediction of pixel values of the current block using pixel values of blocks adjacent to the upper row of the current block. The spatial prediction unit 140 of the present embodiment uses only pixel values of blocks adjacent to the upper row of the current block. The prediction direction may be the perpendicular direction, the right slant direction, or the left slant direction.

The spatial prediction unit 140 performs the spatial prediction of pixel values of a two dimensional block. The two dimensional block has at least two columns.

Figure 5:
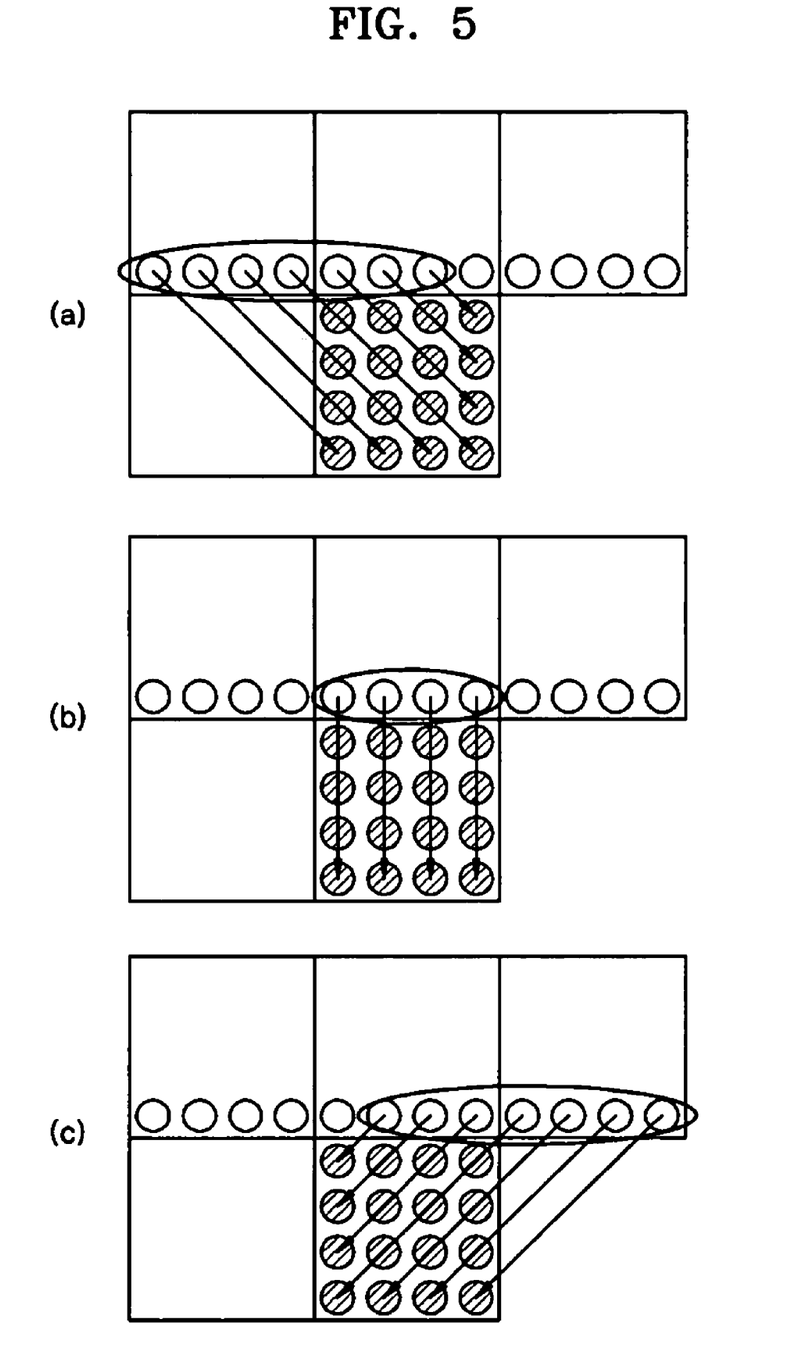
FIG. 5 is a diagram illustrating prediction directions of the 4×4 block corresponding to the two dimensional block.

FIG. 5 is a diagram illustrating prediction directions of the 4×4 block corresponding to the two dimensional block. FIG. 5A is a diagram illustrating the spatial prediction in the right slant direction of the 4×4 block. FIG. 5B is a diagram illustrating the spatial prediction in the perpendicular direction of the 4×4 block. FIG. 5C is a diagram illustrating the spatial prediction in the left slant direction of the 4×4 block. A variety of spatial prediction directions in addition to spatial prediction directions of the two dimensional block shown in FIG. 5 are contemplated.

The spatial prediction unit 140 performs the spatial prediction of pixel values of one dimensional block. The one dimensional block has only one column.

Figure 6:
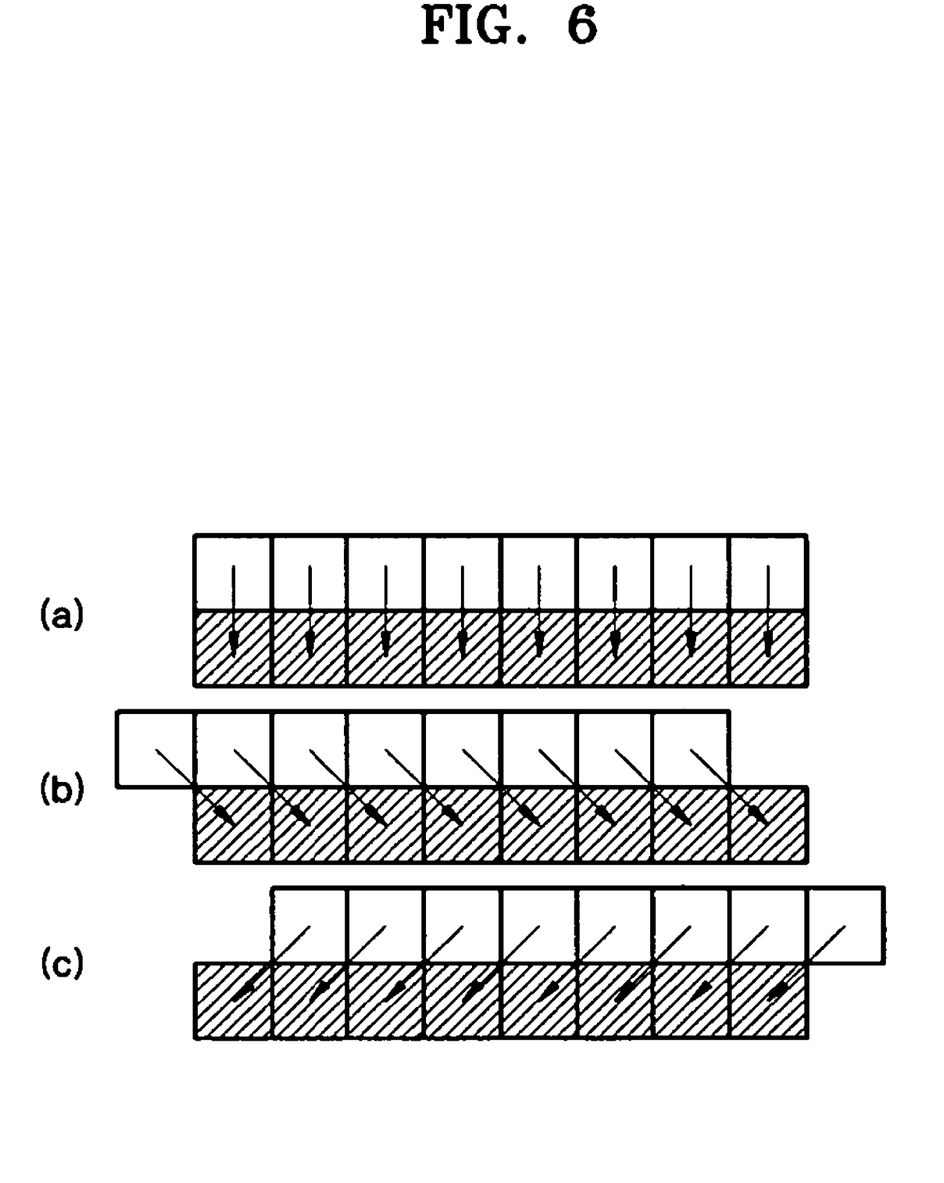
FIG. 6 is a diagram illustrating prediction directions of an 8×1 block corresponding to the one dimensional block.

FIG. 6 is a diagram illustrating prediction directions of an 8×1 block corresponding to the one dimensional block. FIG. 6A is a diagram illustrating the spatial prediction in the perpendicular direction of the 8×1 block. FIG. 6B is a diagram illustrating the spatial prediction in the right slant direction of the 8×1 block. FIG. 6C is a diagram illustrating the spatial prediction in the left slant direction of the 8×1 block. A variety of spatial prediction directions in addition to spatial prediction directions of the one dimensional block shown in FIG. 6 are contemplated.

Figure 7:
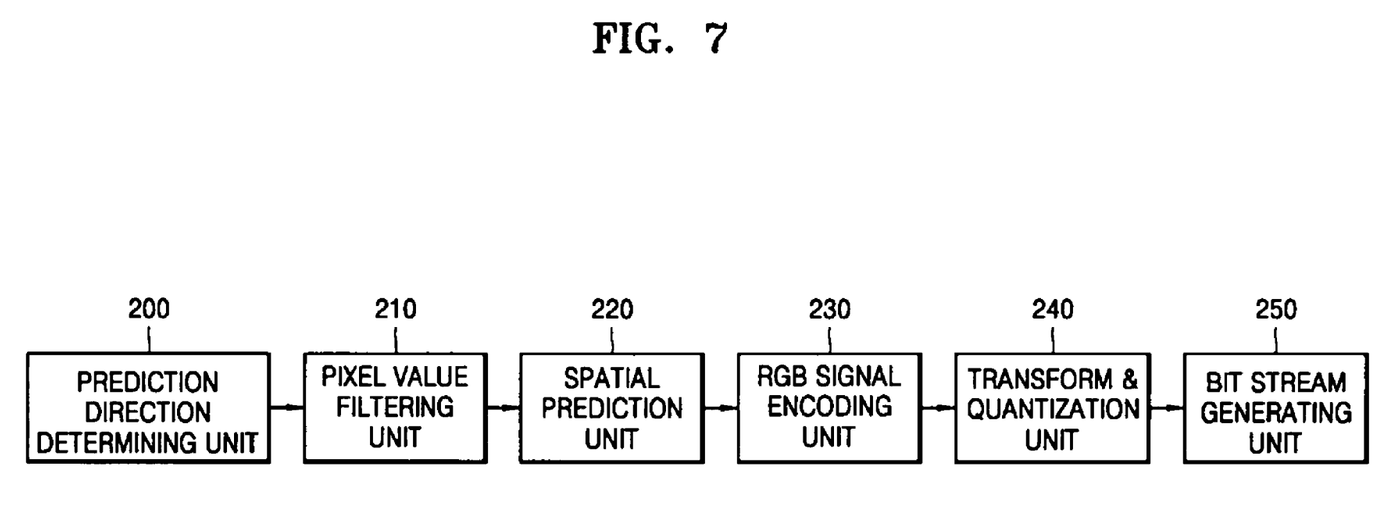
FIG. 7 is a block diagram illustrating an image data encoding apparatus according to an embodiment of the present invention.

FIG. 7 is a block diagram illustrating an image data encoding apparatus according to an embodiment of the present invention. The image data encoding apparatus comprises a prediction direction determining unit 200, a pixel value filtering unit 210, a spatial prediction unit 220, an RGB signal encoding unit 230, a transform and quantization unit 240, and a bit stream generating unit 250.

The prediction direction determining unit 200 determines spatial prediction directions of pixels values of the current block using pixel values of block adjacent to the upper row of the current block, and outputs the determined result to the pixel value filtering unit 210. The spatial prediction direction may be the perpendicular direction, the right slant direction, or the left slant direction, which are determined using pixel values of blocks adjacent to the upper row of the current block.

As in the prediction direction determining unit 100, the prediction direction determining unit 200 determines a different prediction direction of each of the RGB components of an RGB signal, or a common prediction direction of the RGB components. When RGB components have the common prediction direction, the prediction direction determining unit 200 calculates sums of differential values between pixel values of the current block and bocks adjacent to the upper row of the current block for each of the RGB components and determines the prediction direction having a minimum value among sums of differential values for each of the RGB components as the spatial prediction direction. Sums of differential values between pixel values of the current block and blocks adjacent to the upper row of the current block for each of the RGB components are $S_1$, $S_2$, $S_3$, $S_4$, $S_5$, $S_6$ $S_7$, $S_8$, and $S_9$. Since sums of differential values of the perpendicular direction for each of the RGB components are $S_1$, $S_2$, and $S_3$, a sum of $S_1$, $S_2$, and $S_3$ is $S_V = S_1 + S_2 + S_3$. Since sums of differential values of the right slant direction for each of RGB components are $S_4$, $S_5$, and $S_6$, a sum of $S_4$, $S_5$, and $S_6$ is $S_R = S_4 + S_5 + S_6$. Since sums of differential values of the left slant direction for each of the RGB components are $S_7$, $S_8$, and $S_9$, a sum of $S_7$, $S_8$, and $S_9$ is $S_L = S_7 + S_8 + S_9$. Among sums ($S_V$, $S_R$, and $S_L$), the prediction direction having a minimum sum value is determined as the spatial prediction direction. When sums of each of the RGB components are calculated, a different weight is used for each component. For example, when $S_1$ is a sum of differential pixel values for component R, $S_2$ is a sum of differential pixel values for component G, and $S_3$ is a sum of differential pixel values for component B, sums are calculated by applying a different weight to $S_1$, $S_2$, and $S_3$. That is, sums are $S_V = 0.3 \times S_1 + 0.6 \times S_2 + 0.1 \times S_3$. The different weight is applied to $S_1$, $S_2$, and $S_3$ since component G is important to an image. A plurality of weights can be used.

Among direction determination values using sums of differential values of between pixel values of the current block and pixel values of blocks adjacent to the upper row of the current block and compression rates of directions, the prediction direction having a minimum value is determined as the spatial prediction direction. Direction determination values are calculated using the above Equation 1.

The pixel value filtering unit 210 filters pixel values of blocks adjacent to the upper row of the current block used for the spatial prediction of the current block, and outputs the filtered pixel values to the spatial prediction unit 220. Filtering is required to prevent image degradation caused by the spatial prediction using only pixel values of blocks adjacent to the upper row of the current block. A filtering method is the same as described with respect to the pixel value filtering unit 120.

The spatial prediction unit 220 performs the spatial prediction of pixel values of the current block using pixel values of blocks adjacent to the upper row of the current block, and outputs spatially predicted pixel values to the RGB signal encoding unit 230. The spatial prediction unit 220 uses only pixel values of blocks adjacent to the upper row of the current block in order to the spatial prediction. The prediction direction may be the perpendicular direction, the right slant direction, or the left slant direction.

The spatial prediction unit 220 performs the spatial prediction of pixel values of the two dimensional block. The two dimensional block has at least two columns. A detailed description of the spatial prediction unit 220 using the two dimensional block is the same as described with regard to FIG. 5.

The spatial prediction unit 220 performs the spatial prediction of pixel values of one dimensional block. The one dimensional block has only one column. A detailed description of the spatial prediction unit 220 using the one dimensional block is the same as described with reference to FIG. 6.

The RGB signal encoding unit 230 removes redundant information among spatially predicted pixel values of the RGB components, encodes an RGB signal, and outputs the encoded RGB signal having no redundant information to the transform and quantization unit 240. Redundant information is removed using correlation of spatially predicted pixel values of the RGB components and the RGB signal having no redundant information is encoded.

The transform and quantization unit 240 transforms and quantizes spatially predicted pixel values, and outputs the transformed and quantized spatially predicted pixel values to the bit stream generating unit 250. An orthogonal transfer encoding is used to transform spatially predicted pixel values. A discrete cosine transform (DCT) is widely used for the orthogonal transfer encoding. The DCT uses a discrete cosine function as a coefficient to transform the image signal of a temporal axis into the image signal of a frequency axis in the same manner as a fast Fourier transform (FFT). The DCT is used to divide the image signal of the temporal axis into a high frequency region and a low frequency region based on power of several signals. Since power of the image signal is concentrated in the low frequency region, bits are suitably distributed to quantize the image signal and reduce the number of the bits.

The bit stream generating unit 250 generates bit streams of prediction direction information and transformed and quantized pixel values.

Figure 8:
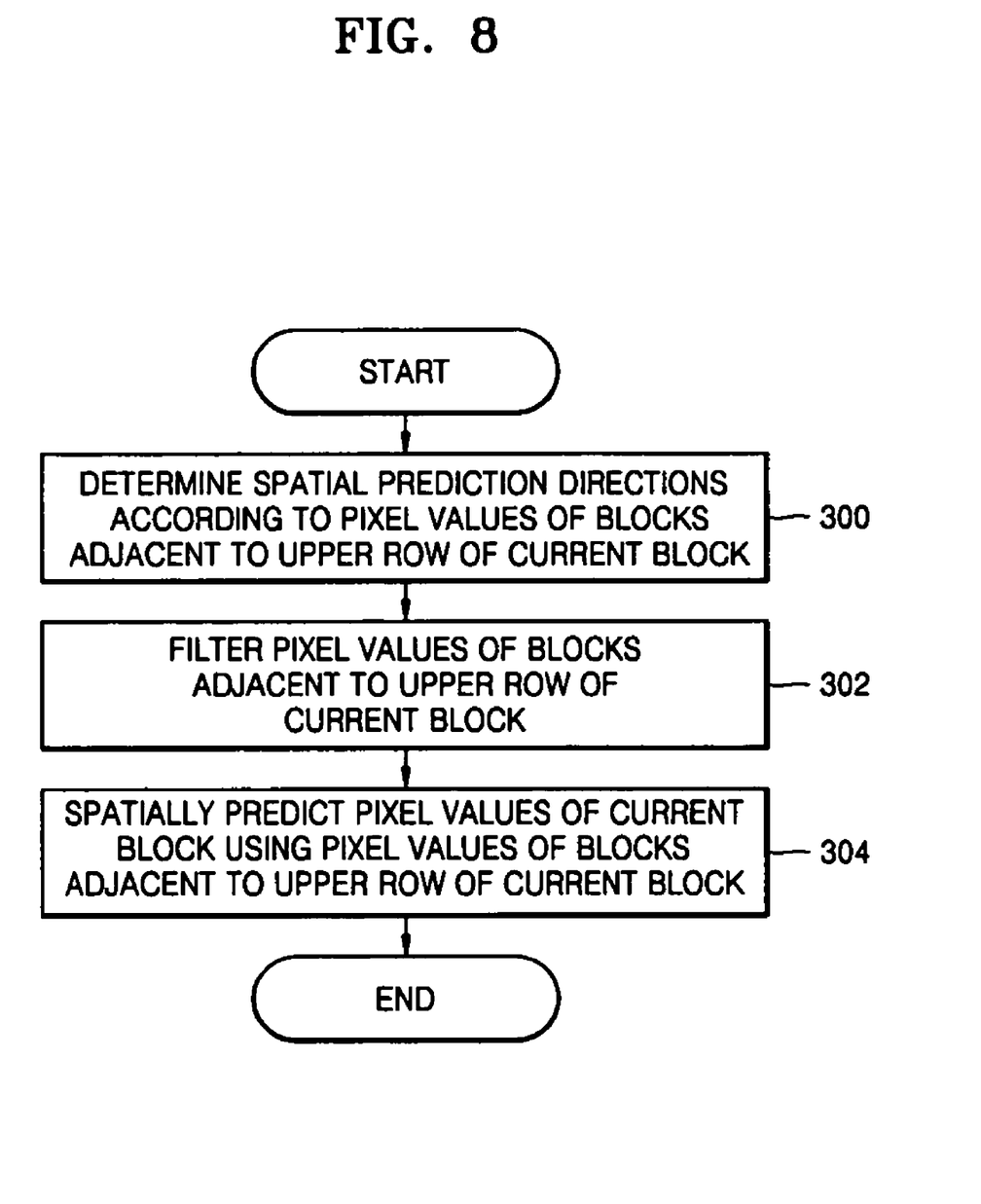
FIG. 8 is a flowchart illustrating a spatial prediction method of image data according to an embodiment of the present invention.

FIG. 8 is a flowchart illustrating a spatial prediction method for image data according to an embodiment of the present invention. Spatial prediction directions are determined according to pixel values of blocks adjacent to the upper row of the current block (Operation 300). The spatial prediction direction may be the perpendicular direction, the right slant direction, or the left slant direction, which are determined using pixel values of blocks adjacent to the upper row of the current block. A detailed description of the spatial prediction direction is the same as described above.

Pixel values of blocks adjacent to the upper row of the current block used for the spatial prediction of the current block are filtered (Operation 302). Filtering is required to prevent an image degradation caused by the spatial prediction using only pixel values of blocks adjacent to the upper row of the current block. A detailed description of a filtering method is the same as described above.

Pixel values of the current block using pixel values of blocks adjacent to the upper row of the current block are spatially predicted (Operation 304). In this case, pixel values of one dimensional block or two dimensional block are spatially predicted. A detailed description of a spatial prediction method of pixel values of the current block using pixel values of blocks adjacent to the upper row of the current block is the same as described above.

Figure 9:
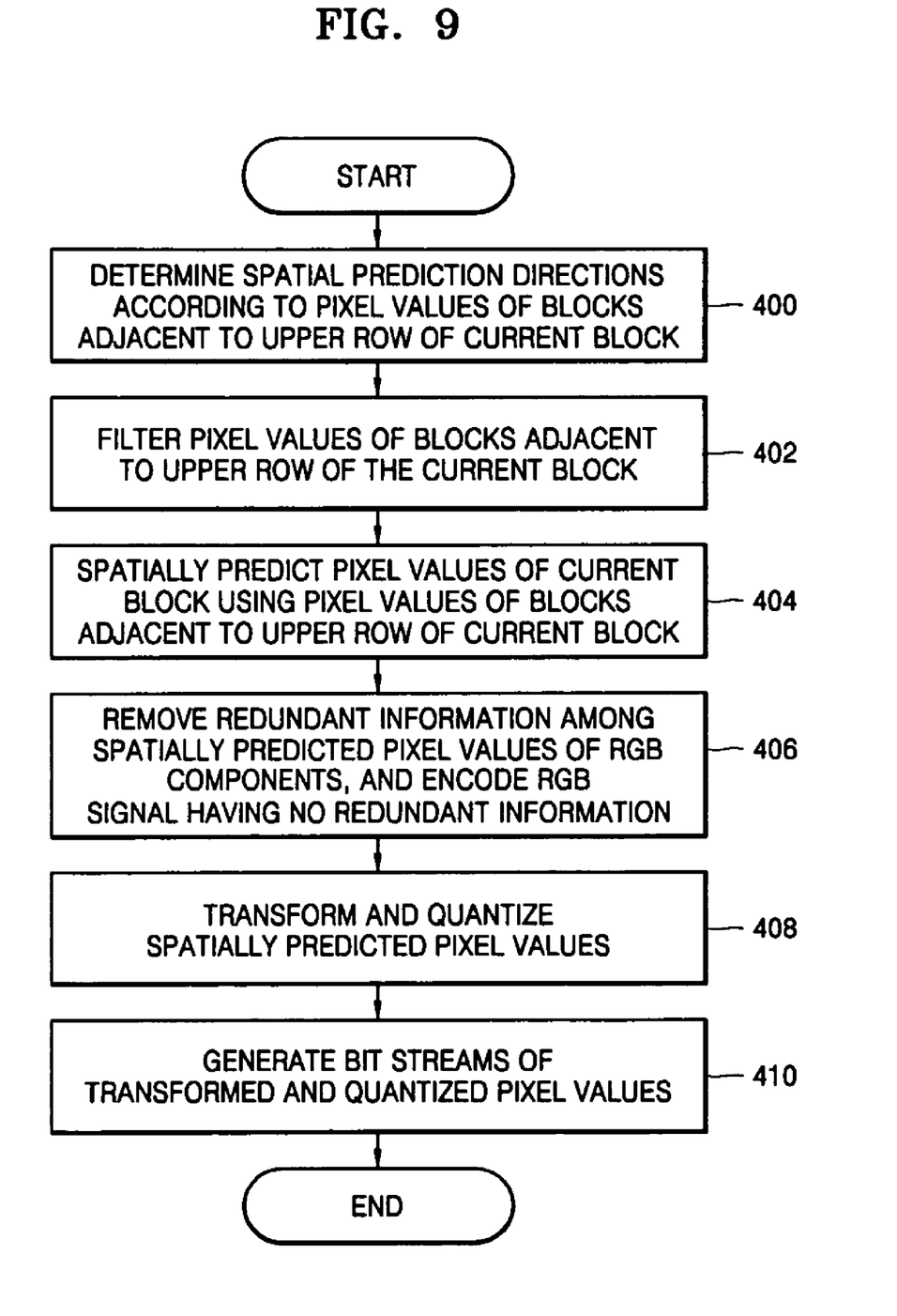
FIG. 9 is a flowchart illustrating an image data encoding method according to an embodiment of the present invention.

FIG. 9 is a flowchart illustrating an image data encoding method according to an embodiment of the present invention. Spatial prediction directions are determined according to pixel values of blocks adjacent to the upper row of the current block (Operation 400). The spatial prediction direction may be the perpendicular direction, the right slant direction, or the left slant direction, which are determined using pixel values of blocks adjacent to the upper row of the current block. Sums of differential values between pixel values of blocks adjacent to the upper row of the current block and pixel values of the current bock are calculated for each of the RGB components. A prediction direction having a minimum value among sums of calculated sums of each of the RGB components is determined as the spatial prediction direction.

The detailed description of the spatial prediction direction is the same as described above.

Pixel values of blocks adjacent to the upper row of the current block used for the spatial prediction of the current block are filtered (Operation 402). The filtering is required to prevent an image degradation caused by the spatial prediction using only pixel values of blocks adjacent to the upper row of the current block.

The detailed description of a filtering method is the same as described above.

Pixel values of the current block using pixel values of blocks adjacent to the upper row of the current block are spatially predicted (Operation 404). In this case, pixel values of one dimensional block or two dimensional block are spatially predicted.

The detailed description of a spatial prediction method of pixel values of the current block using pixel values of blocks adjacent to the upper row of the current block is the same as described above.

Redundant information among spatially predicted pixel values of the RGB components is removed, and an RGB signal having no redundant information is encoded (Operation 406). Redundant information is removed using correlation of spatially predicted pixel values of RGB components and the RGB signal having no redundant information is encoded.

Spatially predicted pixel values are transformed and quantized (Operation 408). The orthogonal transfer encoding is used to transform pixel values. The DCT is widely used for the orthogonal transfer encoding.

Bit streams of the transformed and quantized pixel values are generated (Operation 410). A loss encoding method or a lossless encoding method is used to generate bit streams.

Figure 10:
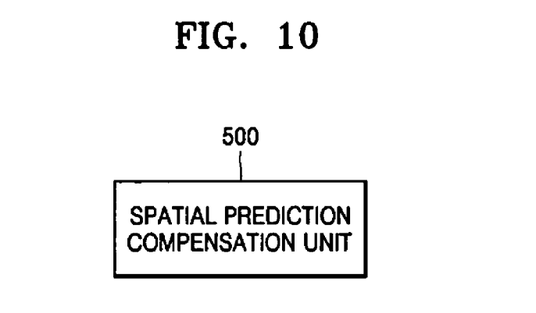
FIG. 10 is a block diagram illustrating a spatial prediction apparatus of image data according to an embodiment of the present invention.

FIG. 10 is a block diagram illustrating a spatial prediction apparatus of image data according to an embodiment of the present invention. The spatial prediction apparatus comprises a spatial prediction compensation unit 500.

The spatial prediction compensation unit 500 compensates for spatially predicted pixel values using blocks adjacent to the upper row of the current block among blocks adjacent to the current block.

The spatial prediction units 140 and 220 of FIGS. 3 and 7, respectively, spatially predicted pixel values of the current block using pixel values using blocks adjacent to the upper row of the current block. When spatially predicted pixel values are decoded, the spatial prediction compensation unit 500 compensates for spatially predicted pixel values using blocks adjacent to the upper row of the current block according to a contrary process of the spatial prediction unit 140 and 220.

Figure 11:
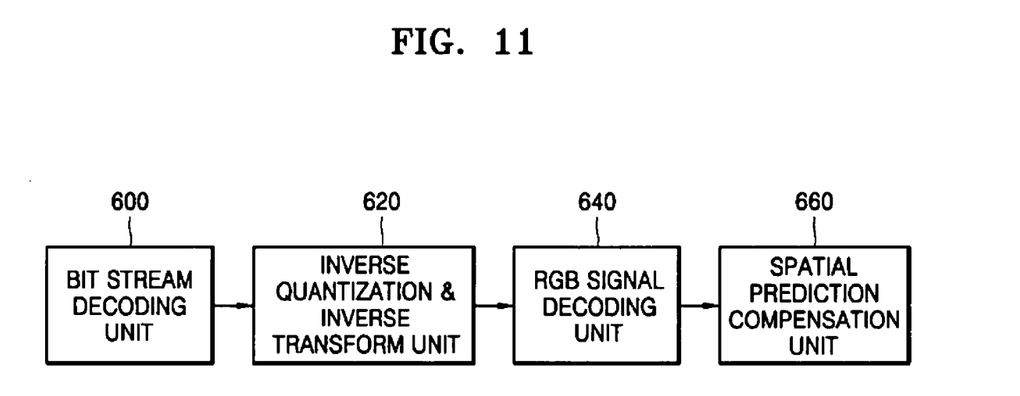
FIG. 11 is a block diagram illustrating an image data decoding apparatus according to an embodiment of the present invention.

FIG. 11 is a block diagram illustrating an image data decoding apparatus according to an embodiment of the present invention. The image data decoding apparatus comprises a bit stream decoding unit 600, an inverse quantization and inverse transform unit 620, an RGB signal decoding unit 640, and a spatial prediction compensation unit 660.

The bit stream decoding unit 600 decodes bit streams of image data, and outputs decoded bit streams to the inverse quantization and inverse conversion unit 620.

The inverse quantization and inverse transform unit 620 inverse quantizes and inverse transforms the decoded image data, and outputs the inverse quantized and inverse transformed image data to the RGB signal decoding unit 640 by performing a contrary process of a transform and quantization process.

The RGB signal decoding unit 640 decodes the inverse quantized and inverse transformed RGB signal, and outputs the decoded RGB signal to the spatial prediction compensation unit 660.

The spatial prediction compensation unit 660 compensates for spatially predicted pixel values using blocks adjacent to the upper row of the current block among blocks adjacent to the current block.

The spatial prediction unit 140 and 220 of FIGS. 3 and 7, respectively, spatially predicted pixel values of the current block using pixel values using blocks adjacent to the upper row of the current block. When spatially predicted pixel values are decoded, the spatial prediction compensation unit 660 compensates for spatially predicted pixel values using blocks adjacent to the upper row of the current block according to the contrary process of the spatial prediction unit 140 and 220.

A method of compensating for spatial prediction of image data will now be described.

Blocks adjacent to the upper row of the current block among blocks adjacent to the current block are used to compensate for spatially predicted pixel values.

Pixel values of blocks adjacent to the upper row of the current block among blocks adjacent to the current block are only used to spatially predict pixel values. When spatially predicted pixel values are decoded, blocks adjacent to the upper row of the current block are used to compensate for spatially predicted pixel values according to an contrary process of the spatial prediction.

Figure 12:
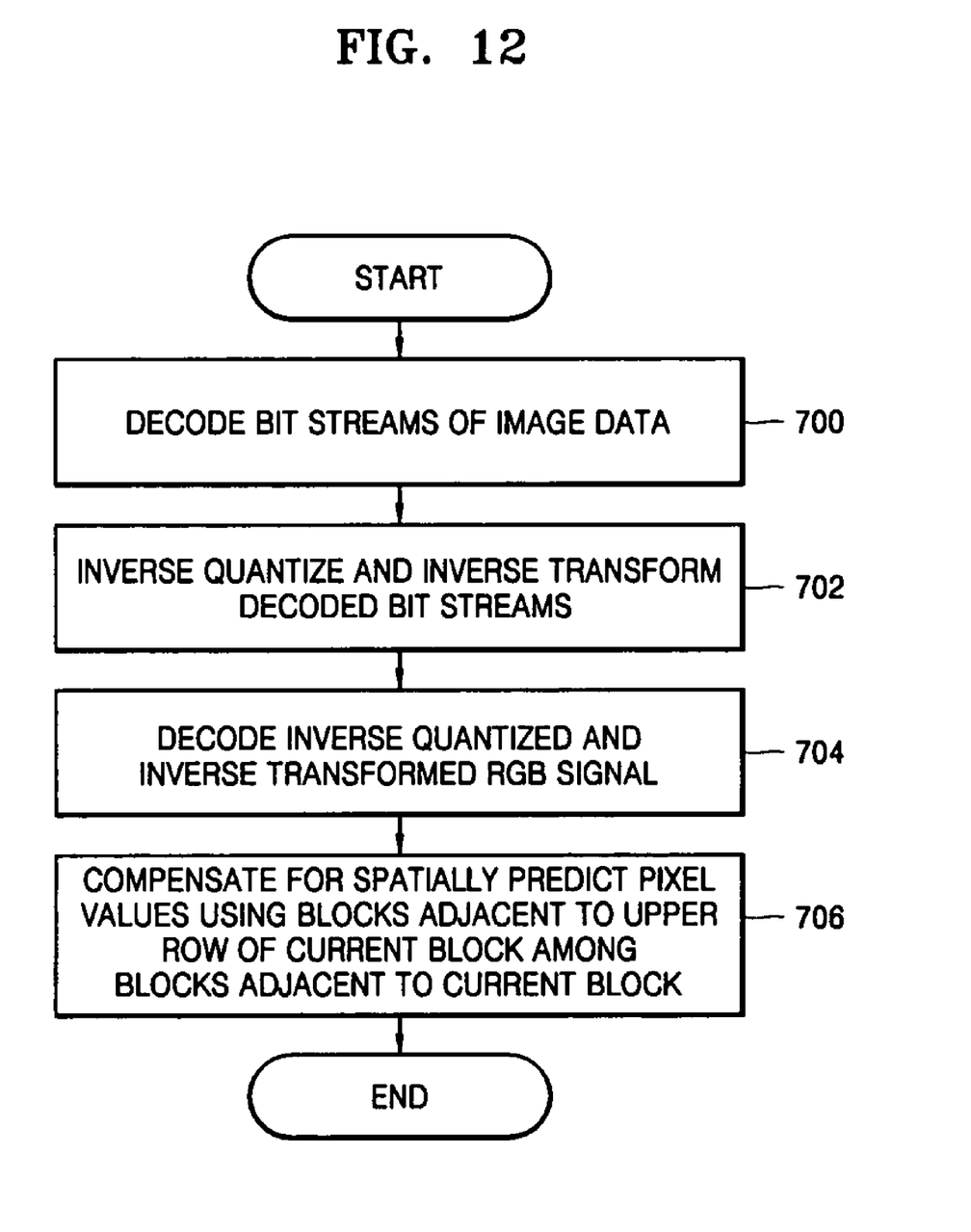
FIG. 12 is a flowchart illustrating an image data decoding method according to an embodiment of the present invention.

FIG. 12 is a flowchart illustrating an image data decoding method according to an embodiment of the present invention. Bit streams of image data are decoded (Operation 700). The decoded bit streams are inverse quantized and inverse transformed (Operation 702) by performing the contrary process of the transform and quantization.

The inverse quantized and inverse transformed RGB signal is decoded (Operation 704).

Blocks adjacent to the upper row of the current block among blocks adjacent to the current block are used to compensate for spatially predict pixel values (Operation 706). Pixel values of blocks adjacent to the upper row of the current block among blocks adjacent to the current block are only used to spatially predict pixel values. When spatially predicted pixel values are decoded, blocks adjacent to the upper row of the current block are used to compensate for spatially predicted pixel values according to the contrary process of the spatial prediction.

The apparatus and method for spatially predicting image data, apparatus and method for encoding image data, the apparatus and method for compensating for spatial prediction of image data, apparatus and method for decoding image data make the pipeline process possible when performing the spatial prediction, thereby performing real time encoding and decoding.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A spatial prediction apparatus for image data, comprising:

a prediction direction determining unit to determine a spatial prediction direction according to pixel values of one or more blocks adjacent to an upper row of a current block other than all blocks in same rows as the current block, wherein the current block has at least one block in the same rows left of the current block; and a spatial prediction unit to perform a spatial prediction of pixel values of the current block of an image using pixel values of the one or more blocks adjacent to the upper row of the current block and outputting the spatially predicted pixel values of the current block, wherein the current block and the one or more blocks adjacent to the upper row of the current block, having adjacent pixels to pixels of the current block, are within a same image, in accordance with the determined spatial prediction direction.

2. The spatial prediction apparatus of claim 1, further comprising:

a pixel value filtering unit to filter the pixel values of the blocks adjacent to the upper row of the current block used for the spatial prediction of the current block.

3. The spatial prediction apparatus of claim 1, wherein the spatial prediction unit performs a spatial prediction of pixel values of a one dimensional block.

4. The spatial prediction apparatus of claim 1, wherein the spatial prediction unit performs a spatial prediction of pixel values of a two dimensional block.

5. The spatial prediction apparatus of claim 1, further comprising:

a prediction direction determining unit determining a spatial prediction direction according to the pixel values of one or more blocks adjacent to the upper row of the current block.

6. An image data encoding apparatus, comprising:

a prediction direction determining unit to determine a spatial prediction direction according to pixel values of one or more blocks adjacent to an upper row of a current block other than all blocks in same rows as the current block, wherein the current block has at least one block in the same rows left of the current block;

a spatial prediction unit to perform a spatial prediction of pixel values of the current block of an image using pixel values of the one or more blocks adjacent to the upper row of the current block, in accordance with the determined spatial prediction direction;

a transform and quantization unit to transform and quantize the spatially predicted pixel values of the current block; and a bit stream generating unit to generate bit streams of the transformed and quantized pixel values, wherein the current block and the one or more blocks adjacent to the upper row of the current block, having adjacent pixels to pixels of the current block, are within a same image.

7. The image data encoding apparatus of claim 6, further comprising:

an RGB signal encoding unit removing redundant information among spatially predicted pixel values of RGB components, and encoding an RGB signal having no redundant information.

8. The image data encoding apparatus of claim 6, wherein the prediction direction determining unit calculates sums of differential values between the pixel values of the current block and the one or more blocks adjacent to the upper row of the current block for each of the RGB components and determines the prediction direction having a minimum value among sums of calculated sums for each of the RGB components as the spatial prediction direction.

9. The image data encoding apparatus of claim 6, further comprising:
a pixel value filtering unit to filter the pixel values of the one or more blocks adjacent to the upper row of the current block used for the spatial prediction of the current block.

10. A spatial prediction method for an image, comprising:
determining a spatial prediction direction according to pixel values of one or more blocks adjacent to an upper row of a current block other than all blocks in same rows as the current block, wherein the current block has at least one block in the same rows left of the current block; and
using at least one processing device performing spatial prediction of pixel values of the current block of the image using pixel values of the one or more blocks adjacent to the upper row of the current block, in accordance with the determined spatial prediction direction, and outputting the spatially predicted pixel values of the current block, wherein the current block and the one or more blocks adjacent to the upper row of the current block, having adjacent pixels to pixels of the current block, are within a same image.

11. The spatial prediction method of claim 10, further comprising:
filtering the pixel values of the one or more blocks adjacent to the upper row of the current block used for the spatial prediction of the current block.

12. The spatial prediction method of claim 10, comprising:
performing a spatial prediction of pixel values of a one dimensional block.

13. The spatial prediction method of claim 10, comprising:
performing a spatial prediction of pixel values of a two dimensional block.

14. An data encoding method for an image, comprising:
determining a spatial prediction direction according to pixel values of one or more blocks adjacent to an upper row of a current block other than all blocks in same rows as the current block, wherein the current block has at least one block in the same rows left of the current block;
using at least one processing device performing a spatial prediction of pixel values of the current block of the image using pixel values of the one or more blocks adjacent to an upper row of the current block, in accordance with the determined spatial prediction direction;
transforming and quantizing spatially predicted pixel values; and
generating bit streams of the transformed and quantized pixel values, wherein the current block and the one or more blocks adjacent to the upper row of the current block, having adjacent pixels to pixels of the current block, are within a same image.

15. The image data encoding method of claim 14, further comprising:
filtering the pixel values of the one or more blocks adjacent to the upper row of the current block used for the spatial prediction of the current block before the performing of the spatial prediction.

16. The image data encoding method of claim 14, wherein, in the performing of the spatial prediction, a spatial prediction of pixel values of a one dimensional block is performed.

17. The image data encoding method of claim 14, wherein, in the performing of the spatial prediction, a spatial prediction of pixel values of a two dimensional block is performed.

18. The image data encoding method of claim 14, further comprising:
removing redundant information among spatially predicted pixel values of RGB components, encoding an RGB signal having no redundant information before the transforming and quantizing.

19. The image data encoding method of claim 18, wherein, in the determining of the spatial prediction direction, sums of differential values between the pixel values of the current block and the one or more blocks adjacent to the upper row of the current block for each of the RGB components are calculated and the prediction direction having a minimum value among sums of calculated sums for each of the RGB components as the spatial prediction direction is predicted.

20. An apparatus for compensating for spatial prediction of image data, comprising:
a spatial prediction compensation unit predicting pixel values for a reconstruction of a current block from spatially predicted pixel values of the current block, the spatially predicted pixel values of the current block being a spatial prediction of pixel values of a current block, having at least one block in same rows left of the current block, of an image using pixel values of one or more blocks adjacent to an upper row of the current block other than all blocks in the same rows as the current block of the image, in accordance with a spatial prediction direction determined by using the one or more blocks adjacent to the upper row of the current block, wherein the current block and the one or more blocks adjacent to the upper row of the current block, having adjacent pixels to pixels of the current block, are within a same image.

21. An image data decoding apparatus, comprising:
a bit stream decoding unit decoding bit streams of image data;
an inverse quantization and inverse transform unit inverse quantizing and inverse transforming the decoded image data; and
a spatial prediction compensation unit predicting pixel values for a reconstruction of a current block from spatially predicted pixel values of the current block, the spatially predicted pixel values of the current block being a spatial prediction of pixel values of a current block, having at least one block in same rows left of the current block, of an image using pixel values of one or more blocks adjacent to an upper row of the current block other than all blocks in the same rows as the current block of the image, in accordance with a spatial prediction direction determined by using the one or more blocks adjacent to the upper row of the current block, wherein the current block and the one or more blocks adjacent to the upper row of the current block, having adjacent pixels to pixels of the current block, are within a same image.

22. The image data decoding apparatus of claim 21, further comprising:
an RGB signal decoding unit decoding an RGB signal.

23. A method of compensating for spatial prediction of image data, comprising:
using at least one processing device predicting pixel values for a reconstruction of a current block from spatially predicted pixel values of the current block, the spatially predicted pixel values of the current block being a spatial prediction of pixel values of a current block, having at least one block in the same rows left of the current block, of an image using pixel values of one or more blocks adjacent to an upper row of the current block other than all blocks in the same rows as the current block of the image, in accordance with a spatial prediction direction determined by using the one or more blocks adjacent to the upper row of the current block, wherein the current block and the one or more blocks adjacent to the upper row of the current block, having adjacent pixels to pixels of the current block, are within a same image.

24. An image data decoding method comprising:
decoding bit streams of image data;
inverse quantizing and inverse transforming the decoded image data; and
using at least one processing device predicting pixel values for a reconstruction of a current block from spatially predicted pixel values of the current block, the spatially predicted pixel values of the current block being a spatial prediction of pixel values of a current block, having at least one block in same rows left of the current block, of an image using pixel values of one or more blocks adjacent to an upper row of the current block other than all blocks in the same rows as the current block of the image, in accordance with a spatial prediction direction determined by using the one or more blocks adjacent to the upper row of the current block, wherein the current block and the one or more blocks adjacent to the upper row of the current block, having adjacent pixels to pixels of the current block, are within a same image.

25. The image data decoding method of claim 24, further comprising:
decoding the RGB signal before the predicting of the pixel values for the reconstruction of the current block.

26. A spatial prediction apparatus for image data, comprising:
a spatial prediction unit performing a spatial prediction of pixel values of a current block, having at least one block in same rows left of the current block, using pixel values of one or more blocks adjacent to an upper row of the current block other than all blocks in the same rows as the current block, in accordance with a spatial prediction direction determined by using the one or more blocks adjacent to the upper row of the current block, performing a spatial prediction of pixel values of another block, having at least one block in same rows left of the other block, adjacent to the current block using pixel values of one or more blocks adjacent to an upper row of the other block other than all blocks in the same rows as the other block, in accordance with another spatial prediction direction determined by using the one or more blocks adjacent to the upper row of the other block, the pixel values of the one or more blocks adjacent to the upper row of the other block including pixel values of the current block that are adjacent to the upper row of the other block, and outputting the spatially predicted pixel values of the current block, wherein the current block and the one or more blocks adjacent to the upper row of the current block, having adjacent pixels to pixels of the current block, are within a same image.

27. An image data encoding apparatus, comprising:
a spatial prediction unit performing a spatial prediction of pixel values of a current block, having at least one block in same rows left of the current block, using pixel values of one or more blocks adjacent to an upper row of the current block other than all blocks in the same rows as the current block, in accordance with a spatial prediction direction determined by using the one or more blocks adjacent to the upper row of the current block, to generate spatially predicted pixel values of the current block, after respective spatial predictions of the pixel values of the one or more blocks adjacent to the upper row of the current block to generate respective spatially predicted pixel values of the one or more blocks adjacent to the upper row of the current block;

a transform and quantization unit transforming and quantizing the spatially predicted pixel values of the current block; and
a bit stream generating unit generating bit streams of the transformed and quantized pixel values, wherein the current block and the one or more blocks adjacent to the upper row of the current block, having adjacent pixels to pixels of the current block, are within a same image.

28. A spatial prediction method for image data, comprising:
using at least one processing device performing a spatial prediction of pixel values of a current block, having at least one block in same rows left of the current block, using pixel values of one or more blocks adjacent to an upper row of the current block other than all blocks in the same rows as the current block, in accordance with a spatial prediction direction determined by using the one or more blocks adjacent to the upper row of the current block, performing a spatial prediction of pixel values of another block, having at least one block in same rows left of the other block, adjacent to the current block using pixel values of one or more blocks adjacent to an upper row of the other block other than all blocks in the same rows as the other block, in accordance with another spatial prediction direction determined by using the one or more blocks adjacent to the upper row of the other block, the pixel values of the one or more blocks adjacent to the upper row of the other block including pixel values of the current block that are adjacent to the upper row of the other block, and outputting the spatially predicted pixel values of the current block, wherein the current block and the one or more blocks adjacent to the upper row of the current block, having adjacent pixels to pixels of the current block, are within the same image.

29. An image data encoding method, comprising:
using at least one processing device performing a spatial prediction of pixel values of a current block, having at least one block in same rows left of the current block, using pixel values of one or more blocks adjacent to an upper row of the current block other than all blocks in the same rows as the current block, in accordance with a spatial prediction direction determined by using the one or more blocks adjacent to the upper row of the current block, and generating spatially predicted pixel values of the current block, after respective spatial predictions of the pixel values of the one or more blocks adjacent to the upper row of the current block to generate respective spatially predicted pixel values of the blocks adjacent to the upper row of the current block;
transforming and quantizing the spatially predicted pixel values of the current block; and
generating bit streams of the transformed and quantized pixel values, wherein the current block and the one or more blocks adjacent to the upper row of the current block, having adjacent pixels to pixels of the current block, are within a same image.

30. An image data encoding method, comprising:
using at least one processing device performing a spatial prediction of pixel values of a current block, having at least one block left of the current block, only using pixel values of pixels adjacent to an upper row of the current block, in accordance with a spatial prediction direction determined by only using the pixels adjacent to the upper row of the current block, and generating spatially predicted pixel values of the current block;

transforming and quantizing the spatially predicted pixel values of the current block; and generating bit streams of the transformed and quantized pixel values, wherein the pixels adjacent to only the upper row of the current block are pixels of one or more blocks adjacent to the upper row of the current block.

* * * * *

UNITED STATES PATENT AND TRADEMARK OFFICE
CERTIFICATE OF CORRECTION

| | |
|---|---|
| PATENT NO. | : 7,957,585 B2 |
| APPLICATION NO. | : 11/264017 |
| DATED | : June 7, 2011 |
| INVENTOR(S) | : Wooshik Kim et al. |

It is certified that error appears in the above-identified patent and that said Letters Patent is hereby corrected as shown below:

First Page Col. 1 (Title), Line 2, After "COMPENSATING" insert --,--.

Column 1, Line 2, After "COMPENSATING" insert --,--.

Column 14, Line 36, In Claim 28, after "within" delete "the" and insert --a--, therefor.

Signed and Sealed this
Third Day of January, 2012

David J. Kappos
*Director of the United States Patent and Trademark Office*